United States Patent [19]

Kirtley, Jr. et al.

[11] 4,060,754
[45] Nov. 29, 1977

[54] ELECTRONIC MOTOR THAT INCLUDES AN ELECTRONIC WAVEFORM SYNTHESIZER AND THE SYNTHESIZER PER SE

[75] Inventors: James L. Kirtley, Jr., Brookline; Richard H. Baker, Bedford, both of Mass.

[73] Assignee: Massachusetts Institute of Technology, Cambridge, Mass.

[21] Appl. No.: 686,355

[22] Filed: May 14, 1976

[51] Int. Cl.² ............................................. H02K 17/08
[52] U.S. Cl. ................................... 318/218; 318/227; 318/230
[58] Field of Search ............... 318/218, 221 R, 220 R, 318/221 F, 221 G, 217, 227, 230

[56] References Cited

U.S. PATENT DOCUMENTS 3,328,660   6/1967   Dunbar .............................. 318/218

*Primary Examiner*—Herman J. Hohauser
*Attorney, Agent, or Firm*—Arthur A. Smith, Jr.; Robert Shaw

[57] ABSTRACT

An electronic motor that accepts single-phase power and converts the same to polyphase power which is delivered to a polyphase winding of the machine. The electronic motor includes an electronic synthesizer. The synthesizer is shown in the context of an electronic motor, but in a wider context as well.

19 Claims, 8 Drawing Figures

ELECTRONIC MOTOR THAT INCLUDES AN ELECTRONIC WAVEFORM SYNTHESIZER AND THE SYNTHESIZER PER SE

The present invention relates to polyphase electronic motors that are powered by single phase energy sources and to electronic waveform synthesizers which are included as part of such electronic motors.

Single phase induction motors are more expensive to build and less efficient to operate than their polyphase counterparts. The lower efficiency is due to a counter-rotating or reverse MMF wave of the same magnitude as the fundamental or forward MMF. This counter-rotating or negative-sequence MMF produces extra losses in both the rotor and the stator and, indeed, produces negative torque. At stall, the torque due to the reverse MMF is equal to the torque due to the forward MMF so that a single phase induction motor cannot start itself without use of auxiliary means. An auxiliary means often used consists of a so-called "split-phase" or auxiliary winding, often connected in series with a capacitor. The phase shift produced by the capacitor serves to suppress the negative phase sequence MMF, thus establishing a preferred starting direction.

Single phase motors are built both with capacitor windings used for starting only and with capacitor windings used all of the time. Because the impedance of the motor changes with speed it is not possible to have optimum starting and running characteristics with the same capacitor. Because of this, motors often have centrifugal switches to disconnect the split-phase winding after the motor has started. Thus, in most single phase motors, the running winding is single phase. This is the reason why single phase motors have poor characteristics when compared with polyphase motors.

A principle object of the present invention is to provide a motor that operates from single phase power, yet has the operating characteristics of a polyphase motor, for both starting and running.

A further object is to provide a novel waveform synthesizer that may be used in connection with the motor.

These and other objects are addressed hereinafter.

The foregoing objects are achieved in an electric motor that has a rotor and a polyphase winding, at least one phase of the winding being adapted to connect directly to an incoming power line and at least one phase of the winding being adapted to connect through control means to the power line. The control means or electronic waveform synthesizer receives incoming power at one phase angle and shifts the same to a new phase angle appropriate to energize the polyphase winding of the motor. The control means includes rectifier means, capacitance means and logic means. The logic means serve to control the bilateral switch means to establish a controllable phase shift between the power line and the said at least one phase. A novel form of electronic waveform synthesizer of broader use is also disclosed.

The invention is hereinafter described with reference to the accompanying drawing in which.

Figure 1:
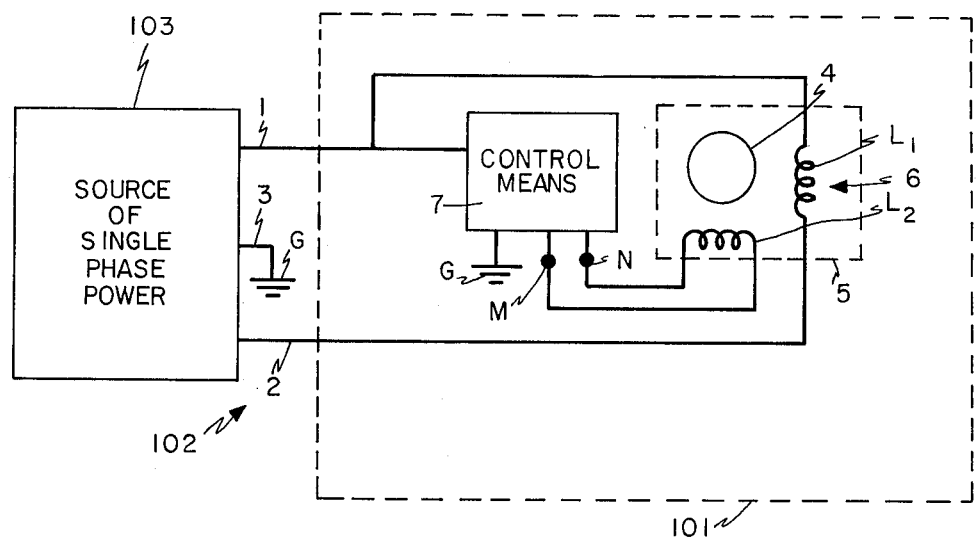
FIG. 1 is a diagrammatic representation of an electronic motor that includes a rotating electric machine and an electronic waveform synthesizer and a power source to energize the electronic motor.

Turning now to FIG. 1, there is shown a system 102 that comprises a source of single phase electric power 103 and an electronic motor 101. Typically the source 102 is the incoming line to a home, say, from the local power company and, in the U.S., such incoming line is a three-wire system at 240 volts between the outside wires labeled 1 and 2 and 120 volts from either outside wire and the neutral wire labeled 3. In FIG. 1 the neutral wire 3 is shown connected to ground G which in an actual system is usually earthing as well as a common connection.

The electronic motor 101 in FIG. 1 includes a rotor 4 and a polyphase winding 6 comprising coils or phases $L_1$ and $L_2$ which together form a rotating electric machine 5. The machine 5 can be a conventional two-phase motor wherein the winding 6 is wound in the usual fashion for such machines and in which the rotor 4 is a squirrel cage structure (but the rotor can comprise permanent magnets also). The schematic representation of the coils or phases $L_1$ and $L_2$ shows the electrical space relationship between the two, that is, the coils $L_1$ and $L_2$ bear a quadrature relationship to one another. The phase $L_1$ is connected directly to the incoming lines, as shown, being connected between the lines 1 and 2; the phase $L_2$ is connected through control means 7 to the power lines 1 and 2. The control means 7 consists of the elements in the blocks labeled 8 and 9 in FIG. 2, as now discussed.

Figure 6:
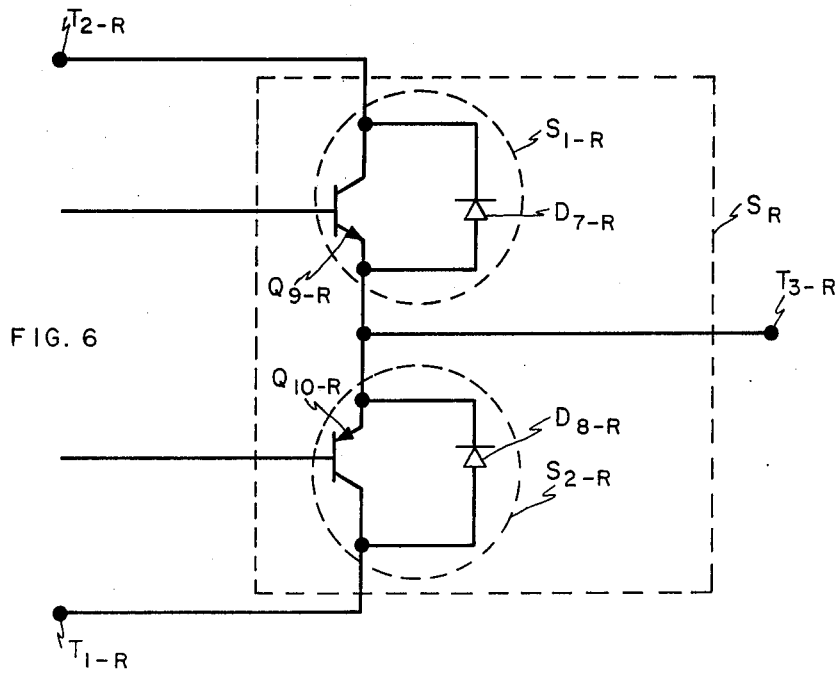
FIG. 6 is a schematic representation to illustrate bilateral solid state switches that may be used in the systems of the other figures.

The motor 5 is a two-phase machine; hence, the voltage applied to the winding $L_2$ must be about 90 electrical degrees out of time phase with the voltage applied to the winding $L_1$. The elements in the block 8 in FIG. 2 form part of a voltage phase shifter to perform the necessary functions. Said elements comprise diodes $D_1$, $D_2$ and $D_3$, capacitors $C_1$ and $C_2$, a first set of bilateral switches $S_1$ and $S_2$ and a second set of switches $S_3$ and $S_4$. The winding $L_2$ is connected at points M and N through the second set of bilateral switches $S_3$ and $S_4$ in such a way that the voltage applied across the winding $L_2$ can be periodically reversed, the voltage thus applied being the synthesized voltage wave shown at 10 in FIG. 3; the voltage wave 10 has an instantaneous value $V_{xy}$ made up of square waves or pulses $x_1$, $x_2$, etc., the negative-going portion of the wave being formed by changing the switch positions of the switches $S_3$ and $S_4$ in the way later discussed herein, and the square-wave voltages $x_1$ etc., are provided by appropriate switching of the first set of switches $S_1$ and $S_2$. The switches $S_1$, etc., are preferably solid-state devices as shown in FIG. 6; in this connection reference may be had to the following U.S. Pat. and applications therefor: U.S. Pat. Nos. 3,748,492 (Baker); 3,866,060 (Bannister et al); 3,867,643 (Baker et al); 3,899,689 (Baker); 3,909,685 (Baker et al); 3,942,028 (Baker); 3,983,503 (Bannister et al); 3,971,976 (Baker)

and Ser. No. 548,493, filed Feb. 10, 1975 (Baker). The logic means or control logic 9 serves to control the switches $S_1$, $S_2$, $S_3$ and $S_4$, to establish a controllable phase shift between the power line voltage and the voltage applied to the phase $L_2$. The control logic 9 can be a microprocessor or other digital logic and the interconnection to effect the necessary switching is detailed in said patents.

Figure 2:
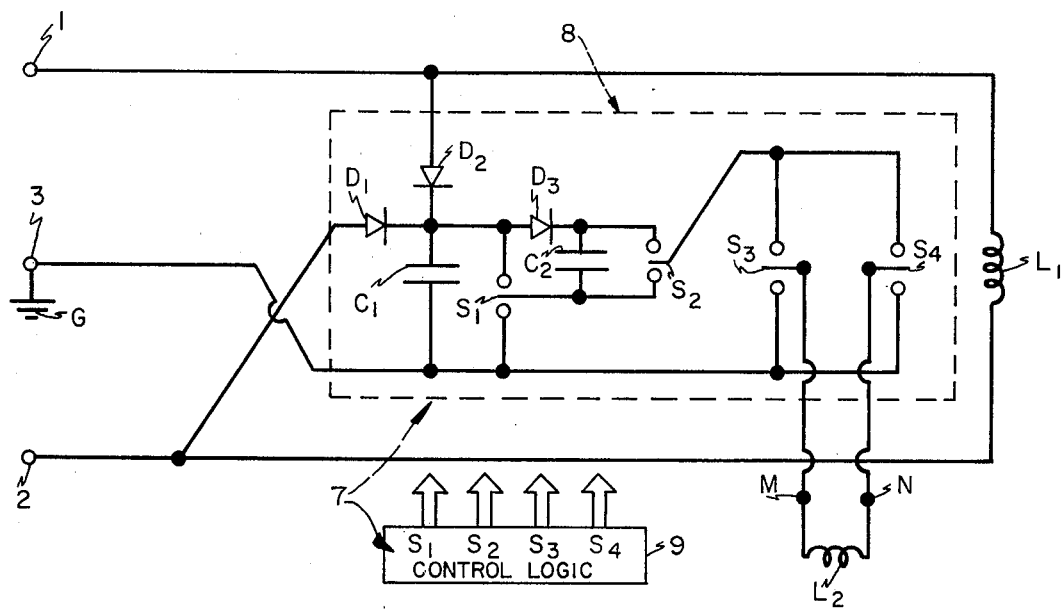
FIG. 2 shows schematically and partly in block diagram form, the electronic motor of FIG. 1, but less rotor and including details of the electronic waveform synthesizer.

The network shown in FIG. 2 is a new method of building a high power phase shifter. As indicated above, the input to the network is standard 3-wire single-phase a-c power which is converted to d-c by the rectifier diodes $D_1$ and $D_2$. The capacitor $C_2$ is charged from the capacitor $C_1$ through the diode $D_3$ whenever the switch $S_1$ is in the "down position". The a-c energy stored on the capacitors $C_1$ and $C_2$ is reconverted back to a-c energy by operation of the switches $S_1$, $S_2$, $S_3$ and $S_4$. The timing and switching pattern (format) of the power switches $S_1$, $S_2$, $S_3$ and $S_4$ is controlled to give a quasi-sinusoidal waveform that is shifted by about 90° (actually any desired phase shift can be obtained) with respect to the input sinewave.

Figure 3:
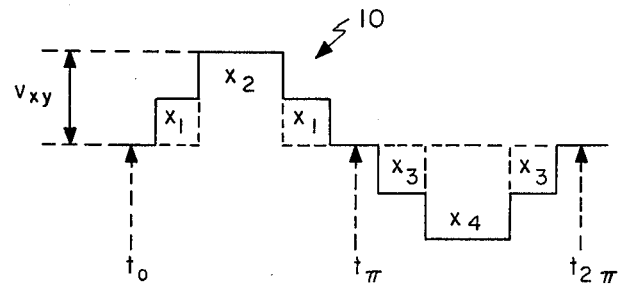
FIG. 3 is a time-voltage diagram of the voltage applied across one phase of the motor of FIG. 2.

The switching sequence of the power switches $S_1$, $S_2$, $S_3$ and $S_4$ that is required in order to generate a stepped sinusoid across the coil $L_2$ can be inferred from the waveform $V_{xy}$ of FIG. 3; (i.e., the waveform 10) to generate section $x_1$, the switch $S_1$ is "down", $S_2$ "up", $S_3$ "down", and $S_4$ "up". The pulse $x_2$ is generated when both switches $S_1$ and $S_2$ are "up" while $S_3$ remains "down" and $S_4$ remains "up". To obtain section $x_3$, the switch $S_1$ is again "down" and the switch $S_2$ is "up" but now $S_3$ is "up" and $S_4$ is "down". Thus, it can be seen that a stepped sinusoid can be obtained by switching $S_1$ and $S_2$ up and back down in sequence. This causes the voltage at the output switch $S_2$ to vary in a sequentially stepped fashion from a value of zero to E, thence to 2E, and thence back to zero again. Each time the stepped voltage at the output switch $S_2$ in FIG. 2 is equal to 0 volts, the settings of the switches $S_3$ and $S_4$ are reversed. This allows the single polarity waveform at the output of switch $S_2$ to be transformed to a bipolarity sinusoid across the coil $L_2$.

On the basis of the foregoing explanation, it can now be seen that the second set of bilateral switches $S_3$ and $S_4$ operates as mixer switches to connect the capacitors $C_1$ or $C_2$ (or more or less capacitors as needed) across the phase $L_2$ at one polarity, to reverse the polarity and to electrically short said phase $L_2$.

Because the phase shifter 8 does not employ magnetic components (i.e., transformers or chokes), the system is a light-weight, low-cost structure that can be built to operate over a wide range of power levels. Also, the capacitors $C_1$ and $C_2$ operate in shunt and thus mostly in a d-c voltage mode, that is, the voltage across the capacitor terminals does not change polarity. The capacitors $C_1$ and $C_2$ are operated in a d-c mode and hence can be smaller than the a-c capacitors of the same KVA rating that are used in conventional single-phase, capacitor start/and/or run motors.

Figure 4:
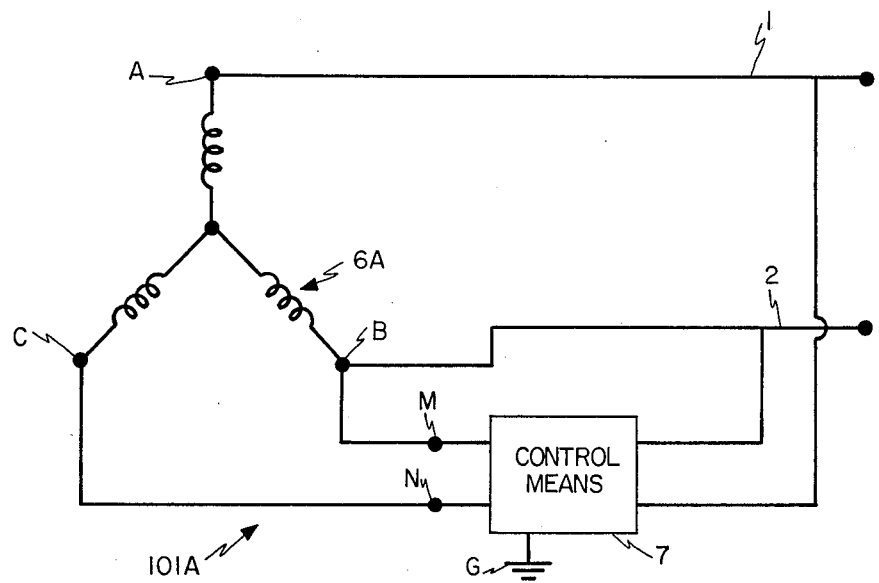
FIGS. 4 and 5 shows schematically and partly in block diagram form modifications of the electronic motor of FIG. 1.
Figure 5:
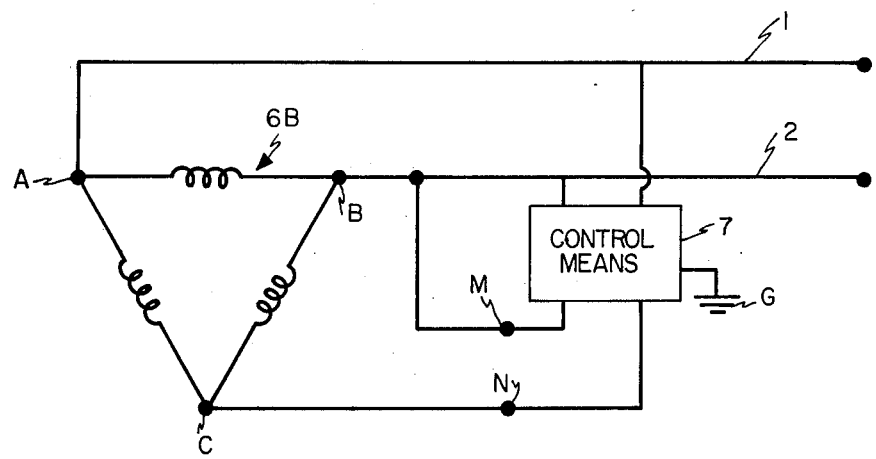

As is noted above, the rotating electric machine 5 is two-phase and the phase shift of the control means 7 is 90°, whereas the electronic motors 101A and 101B shown respectively in FIGS. 4 and 5 are three-phase rotating electric machines whose stator windings 6A and 6B are respectively wye-connected and delta-connected. The terminals of the three-phase windings are both marked A, B and C. The input to the terminals A, B and C of the machines 101A and 101B is as follows: the two terminals A and B are connected across the incoming power line (i.e., between the lines 1 and 2), the third terminal C is connected to one output (i.e., the point N) of the control means 7 and the other output (i.e., the point M) of the control means 7 is connected to the terminal B. The incoming line with the intervening control means 7 constitute an open-delta power source for the machines 101A and 101B.

The semiconducting solid-state switch shown at $S_R$ in FIG. 6 can be any one of the switches $S_1$, etc. The switch $S_R$ comprises bilateral solid state switches $S_{1-R}$ and $S_{2-R}$ which, in turn, comprise a transistor $Q_{9-R}$ and a diode $D_{7-R}$ and a transistor $Q_{10-R}$ and a diode $D_{8-R}$, respectively. The lead terminals of the switch $S_R$ are marked $T_{1-R}$, $T_{2-R}$ and $T_{3-R}$.

The emphasis above with respect to the elements in the blocks 8 and 9 that form the control means 7 in FIG. 2 is to the phase shifting capability thereof, but the control means 7 is also an electronic waveform synthesizer. In the next few paragraphs, the voltage waveform synthesizing characteristics are emphasized with reference to the circuitry labeled 7A in FIG. 7, that is similar to, but not the same as, the circuitry 7 of FIG. 2.

Figure 7:
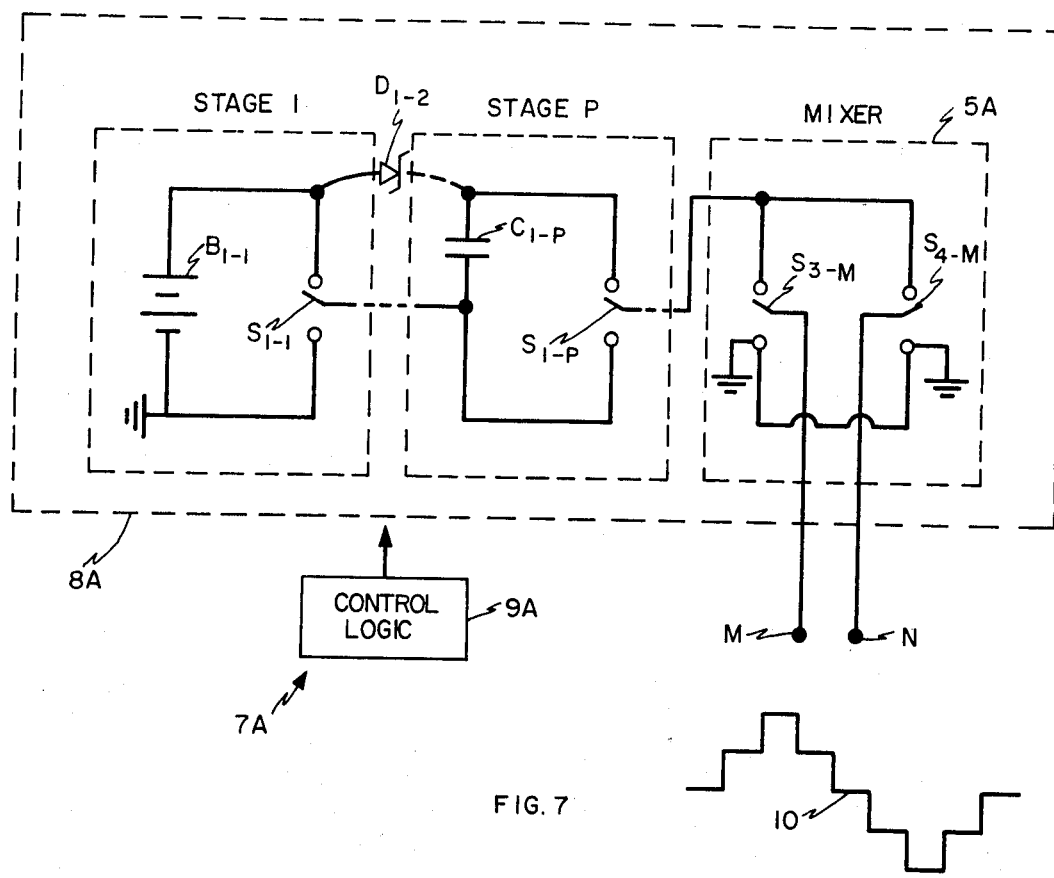
FIG. 7 is a schematic representation of a slightly modified version of .he waveform synthezer.
Figure 8:
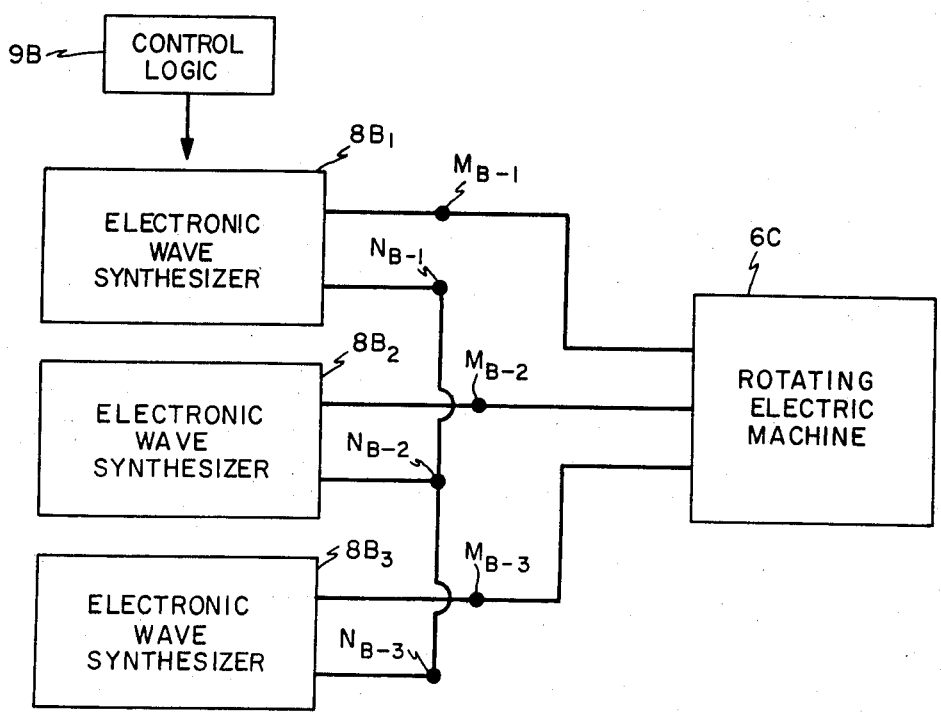
FIG. 8 shows schematically another type of electronic motor.

The electronic network shown at 7A in FIG. 7 is an electronic waveform synthesizer that comprises a plurality of stages connected in cascade, the stages being designated Stage 1 . . . Stage P . . . ; the two stages, Stage 1 and Stage P, can be two stages of a multistage system as described in the several above-numbered patents. The Stage P can be an intermediate stage of such multistage system. Each stage comprises d-c or unidirectional supply voltage means (e.g., the battery labeled $B_{1-1}$ in the Stage 1 and the capacitor labeled $C_{1-P}$ in the Stage P) and bilateral stage switch means (i.e., the switches labeled $S_{1-1}$ and $S_{1-P}$). The bilateral stage switches $S_{1-1}$ and $S_{1-P}$ (which again may each be like the switch $S_R$) serve to determine whether electric current flows into or out of the battery $B_{1-1}$ and the capacitor $C_{1-P}$ (in a charging mode or in a discharging mode, respectively) but they serve, as well, to effect an electrical bypass of the d-c or unidirectional supply voltage means in a programmable fashion. With reference now briefly to FIG. 8, three electronic wave synthesizers 8B, 8B$_2$ and 8B$_3$ are shown powering a polyphase rotating electric machine (or winding) 6C which may be a synchronous machine driving, say, an electrical vehicle. The synthesizers transfer energy to the machine 6C in a discharge mode but during dynamic braking energy transfer is back to the synthesizers to charge the battery $B_{1-1}$, mostly, and the capacitor $C_{1-P}$. The points $M_{B-1}$ . . . and $N_{B-1}$ . . . correspond to M and N in the other figures and control logic 9B functions similarly to the control logic above discussed.

The cascaded stages in FIG. 7 are connected to an electronic mixer 11M comprising bilateral mixer switches $S_{3-M}$ and $S_{4-M}$ that act in the same manner as the switches $S_{3-M}$ and $S_{4-m}$, that is, the switches $S_{3-P}$ and $S_{4-P}$ receive the d-c or unidirectional electric potential of the battery $B_{1-1}$ and/or the capacitor $C_{1-P}$ and reverse the polarity of that potential in a determined and programmable fashion so that the output of the electronic waveform synthesizer 7A at points M and N in FIG. 7 is alternating in nature even though the supply voltage means of said stages is d-c or unidirectional in nature. Control logic 9A serves to activate the bilateral stage switches $S_{1-1}$ and $S_{1-P}$ and the bilateral mixer switch $S_{3-M}$ and $S_{4-M}$ in a programmable fashion. The output waveform between the points M and N in FIG.

7 is again labeled 10. It will be appreciated that a single stage (e.g. the Stage 1) can be used to provide a square wave output if the energized load and other circumstances will allow.

A few random matters are included in this paragraph. It will be appreciated that the synthesizer 7A can consist of many more stages than the pair of stages shown in FIG. 7 and the waveform synthesized can be sinusoidal in nature as shown or it can merely be many pulses. The d-c or unidirectional supply voltage means of any or all the stages can be re-chargeable batteries, capacitors, solar cells, fuel cells, or the like. The networks shown in FIGS. 7 and 8 have meaning, also, in the systems disclosed in an application for Letters Pat. entitled "A Voltage Waveform Synthesizer and A System that Includes the Same" Ser. No. 683,438, filed May 14, 1976.

Further modifications of the invention herein disclosed will occur to persons skilled in the art and all such modifications are deemed to be within the spirit and the scope of the invention as defined by the appended claims.

What is claimed is:

1. An electronic motor that comprises, in combination, a polyphase winding, at least one phase of the winding being adapted to connect directly across an incoming power line and at least one other phase of the winding being adapted to connect through control means to the power line, said control means comprising rectifier means, capacitance means, bilateral switch means, and logic means, the switch means serving to control the output of the rectifier means, and the logic means serving to control the bilateral switch means to establish a controllable phase shift between the power line voltage and the voltage applied to said at least one other phase.

2. An electronic motor as claimed in claim 1 in which the winding is a two-phase winding and in which the control means acts to shift the voltage applied to said other phase through ninety electrical degrees.

3. An electronic motor as claimed in claim 1 in which the winding is a three-phase winding whose three terminals are connected as follows: two terminals are connected across the incoming power line, the third terminal is connected to one output of the control means and the other output of the control means is connected to one of said two terminals.

4. An electronic motor as claimed in claim 3 wherein the winding is delta connected.

5. An electronic motor as claimed in claim 3 wherein the winding is wye-connected.

6. An electronic motor as claimed in claim 1 wherein said capacitance means comprises at least one capacitor connected in shunt so that said capacitor operates mostly in a d-c voltage mode.

7. An electronic motor as claimed in claim 6 wherein the switch means is operable to connect the capacitor across said other phase at one polarity, to reverse the polarity and to electrically short said one phase.

8. An electronic motor as claimed in claim 1 in which said capacitance means comprises a plurality of capacitors connected in shunt so that the capacitors operate mostly in a d-c voltage mode.

9. An electronic motor as claimed in claim 8 wherein the switch means is operable to connect selectively the individual capacitors of the capacitance means across said other phase to provide a plurality of voltage levels both positive and negative as well as zero, across said other phase and to control the electrical phase angle thereof.

10. Apparatus that comprises, in combination, a polyphase load, at least one phase of the polyphase load being adapted to connect directly across an incoming power line and at least one other phase of the polyphase load being adapted to connect through control means to the power line, said control means comprising rectifier means, capacitance means, bilateral switch means, and logic means, the switch means serving to control the output of the rectifier means, the logic means serving to control the bilateral switch means to establish a controllable phase shift between the power line voltage and the voltage applied to said at least one other phase.

11. An electronic waveform synethesizer that comprises, in combination: a plurality of stages connected in cascade, each stage comprising d-c or unidirectional supply voltage means, and bilateral stage switch means, the bilateral stage switch means serving to determine whether electric current flows into or out of the d-c or unidirectional supply voltage means of each phase and serving, as well, to effect an electrical bypass of the d-c or unidirectional supply voltage means of the stage in a programmable fashion; electronic mixer means connected to receive the output from the plurality of stages, said electronic mixer means comprising a plurality of bilateral mixer switch means that receives the d-c or unidirectional electric potential of the d-c or unidirectional supply voltage means of one or more of the stages and is operable to reverse the polarity thereof in a determined and programmable fashion so that the output of the electronic waveform synthesizer is alternating in nature even though the supply voltage means of said stages is d-c or unidirectional in nature; and control logic means that serves to activate the bilateral stage switch means and the bilateral mixer switch means in a programmable fashion.

12. An electronic waveform synthesizer as claimed in claim 11 in which the bilateral stage switch means and the bilateral mixer switch means comprise bilateral semiconductor switches.

13. An electronic waveform synthesizer as claimed in claim 11 wherein the d-c or unidirectional supply voltage means of the first stage of the plurality of stages is a rechargeable battery, in which the d-c or unidirectional supply voltage means of a subsequent stage or stages is capacitor means in each stage, and in which diode means is provided between stages to permit charging of the capacitor means from the battery.

14. An electronic waveform synthesizer that comprises, in combination: at least one stage comprising d-c or unidirectional supply voltage means and bilateral stage switch means, the bilateral stage switch means serving to determine whether electric current flows into or out of the d-c or unidirectional supply voltage means of each phase and serving, as well, to effect an electrical bypass of the d-c or unidirectional supply voltage means of the stage in a programmable fashion; electronic mixer means connected to receive the output from the at least one stage, said electronic mixer means comprising bilateral mixer switch means that receives d-c or unidirectional electric potential of the d-c or unidirectional supply voltage means of the at least one stage and is operable to reverse the polarity there-of in a determined and programmable fashion so that the output of the electronic waveform synthesizer is alternating in nature even though the supply voltage means of said at least one stage is d-c or unidirectional in nature; and control logic means that serves to activate the bilateral stage switch means and the bilateral mixer switch means in a programmable fashion.

15. An electronic waveform synthesizer as claimed in claim 14 in which the bilateral stage switch means and the bilateral mixer switch means comprise bilateral semiconductor switches.

16. An electronic waveform synthesizer that comprises, in combination: an electric stage comprising d-c or unidirectional supply voltage means and bilateral stage switch means, the bilateral stage switch means serving to control electric current flow of the d-c or unidirectional supply voltage means of the stage and serving, as well, to effect an electrical bypass of the d-c or unidirectional supply voltage means of the stage in a programmable fashion; electronic mixer means connected to receive the output from the stage, said electronic mixer means comprising a plurality of bilateral mixer switch means connected to receive the d-c or unidirectional electric potential of the d-c or unidirectional supply voltage means of the stage and operable to process the same in a determined and programmable fashion so that there appears at the output port of the electronic waveform synthesizer a waveform that is alternating in nature even though the supply voltage means of said stage is d-c or unidirectional in nature; and control logic means that serves to activate the bilateral stage switch means and the bilateral mixer switch means in a programmable fashion.

17. An electronic waveform synthesizer as claimed in claim 16 in which the bilateral stage switch means and the bilateral mixer switch means comprise bilateral semiconductor switches.

18. An electronic waveform synthesizer as claimed in claim 17 in which the supply voltage means of the stage comprises rechargeable battery means and wherein the control logic means serves to permit power to flow into the electronic waveform synthesizer as well as from the electronic waveform synthesizer.

19. An electronic rotating machine that comprises a plurality of electronic waveform synthesizers connected to provide a polyphase output and a rotating electric machine connected to receive said output and to be powered thereby, each synthesizer of said plurality including, in combination: an electric stage comprising d-c or unidirectional supply voltage means and bilateral stage switch means, the bilateral stage switch means serving to control electric current flow of the d-c or unidirectional supply voltage means of the stage and serving, as well, to effect an electrical bypass of the d-c or unidirectional supply voltage means of the stage in a programmable fashion; electronic mixer means connected to receive the output from the stage, said electronic mixer means comprising a plurality of bilateral mixer switch means connected to receive the d-c or unidirectional electric potential of the d-c or unidirectional supply voltage means of the stage and operable to process the same in a determined and programmable fashion so that there appears at the output port of the electronic waveform synthesizer a waveform that is alternating in nature even though the supply voltage means of said stage is d-c or unidirectional in nature; and control logic means that serves to activate the bilateral stage switch means and the bilaterial mixer switch means in a programmable fashion.

* * * * *